(12) United States Patent
Jackson

(10) Patent No.: US 7,702,717 B2
(45) Date of Patent: Apr. 20, 2010

(54) METHOD AND APPARATUS FOR CONTROLLING MANAGEMENT AGENTS IN A COMPUTER SYSTEM ON A PACKET-SWITCHED INPUT/OUTPUT NETWORK

(75) Inventor: Christopher J. Jackson, Westford, MA (US)

(73) Assignee: Oracle America, Inc., Redwood Shores, CA (US)

( * ) Notice: Subject to any disclaimer, the term of this patent is extended or adjusted under 35 U.S.C. 154(b) by 1376 days.

(21) Appl. No.: 10/402,895

(22) Filed: Mar. 27, 2003

(65) Prior Publication Data

US 2004/0190546 A1    Sep. 30, 2004

(51) Int. Cl.
*G06F 15/16* (2006.01)
(52) U.S. Cl. .................. 709/201; 709/203; 709/223; 370/463
(58) Field of Classification Search ............ 709/223, 709/201, 203; 370/463
See application file for complete search history.

(56) References Cited

U.S. PATENT DOCUMENTS 5,805,072 A * 9/1998 Kakemizu .................. 370/408
6,574,656 B1 * 6/2003 Nagaoka et al. ............. 709/201

* cited by examiner

*Primary Examiner*—Vivek Srivastava
*Assistant Examiner*—Adnan Mirza
(74) *Attorney, Agent, or Firm*—Dorsey & Whitney LLP

(57) ABSTRACT

A communications node connected to a packet-switched data input/output network, such as an InfiniBand® network, has a plurality of processing cores on which a subnet management agent may be run. The subnet management agent processes management instructions relating to node configuration. In the invention, the processing core running the subnet management agent may be dynamically changed by one or more of the processing cores in the node. The processing cores may include a host processor, a service processor and an embedded processor, dedicated to a host channel adapter, which provides a communications interface between the network and the node. Various methods may be used to move the subnet management agent, including the use of a register to which one or more of the processing cores may write, and in which is stored an indication of which processing core is currently running the subnet management agent.

31 Claims, 9 Drawing Sheets

METHOD AND APPARATUS FOR CONTROLLING MANAGEMENT AGENTS IN A COMPUTER SYSTEM ON A PACKET-SWITCHED INPUT/OUTPUT NETWORK

FIELD OF THE INVENTION

This invention relates generally to the field of computer input/output systems and, more specifically, to the use of a packet-switched input/output network.

BACKGROUND OF THE INVENTION

In recent years, packet-switched data communication has become more commonplace. One of the newer arenas in which packet-switched technology has been applied is in connection with input/output (I/O) devices. A well-known example of packet-switched I/O technology is an InfiniBand® network (InfiniBand® is a registered trademark of System I/O, Inc.). The InfiniBand® specification defines a protocol by which a serial, full duplex, packet-switched data I/O communications network is established. The packet-switched nature of the network allows for more flexible topologies than a traditional bus design. Switches in the network interconnect multiple links by passing data packets between various ports. The network may also be broken down into "subnets," which are connected to one another by routers. The subnets provide the network with a certain modularity not unlike "local" and "long distance" telephone services.

Communications between two points on an InfiniBand® network (sometimes referred to as a switch "fabric") requires communications devices at each of the points. A general-purpose computer may be connected to the fabric with a "host channel adapter," which is an intelligent interface that makes use of a direct connection to the computer memory to perform complex transfer operations. A "target channel adapter" is also a smart device, but is configured to work with an I/O device being accessed, such as a disk array. The target channel adapter does not need to be connected to a general-purpose computer.

SUMMARY OF THE INVENTION

In accordance with the present invention, a communications node connected to a packet-switched data input/output network has several independent processing cores, and the processing core that handles incoming management instructions may be dynamically changed. The network may be an input/output network such as one operating according to InfiniBand® protocols. The communications node includes a host channel adapter, which provides a communications interface between the network and the node. One of the multiple processing cores may be a processor for a host computer that runs a host operating system. The node may also include a service processor that performs supervisory operations, including the configuration and management of components of the host computer.

In one embodiment of the invention, one of the host computer and the service processor runs a subnet management agent software routine that configures components of the node in response to predetermined management instructions. Associated with the node is a hierarchical control system that, when implemented, moves the subnet management agent from one to the other of the host computer and the service processor. In this way, the processing core handling the incoming management instructions may be changed dynamically.

Although the node may take a number of different forms, it may include a memory bus via which data is transmitted between components of the node. A service bus may also be included via which management instructions are transmitted between components of the node. The service bus may be a serial bus, while the memory bus may be a parallel bus. It is also possible to have multiple host channel adapters in the same communications node.

In a different embodiment of the invention, the communications node also includes an embedded processor that serves as a processing core that is independent from that of the service processor and the host processor. The embedded processor may be dedicated to the host channel adapter. In this embodiment, the subnet management agent may be run by any of the different processing cores, including the embedded processor.

A variety of different mechanisms, both hardware and software, may be used to provide the dynamic control of which processing core runs the subnet management agent. In one embodiment, the control system comprises an OWNER register in which is stored an indication of the processing core currently in charge of running the subnet management agent. The OWNER register may be written to by one of the processing cores, such as the host processor or the service processor. A data buffer may also be provided in which data received over the network is stored. When data stored in the buffer comprises management instructions, the data is retrieved by the processing core identified in the OWNER register. When there is a change in the processing core in charge of running the subnet management agent, the OWNER register may be written to so as to change the stored identification of the processing core that should be processing the management instructions.

BRIEF DESCRIPTION OF THE DRAWINGS

The above and further advantages of the invention may be better understood by referring to the following description in conjunction with the accompanying drawings in which.

DETAILED DESCRIPTION

Figure 1:
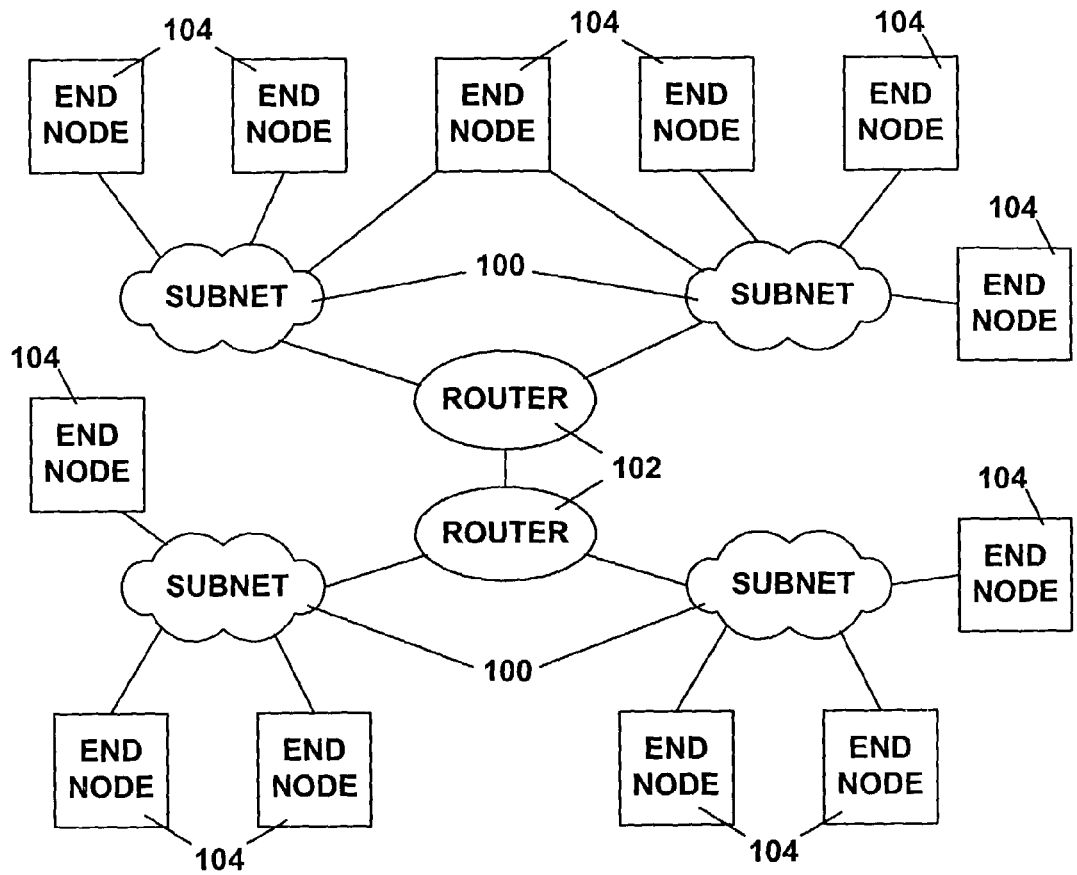
FIG. 1 is a schematic view of a packet switched I/O network.

In a serial, packet-switched I/O environment, such as InfiniBand®, components are connected to a switching fabric, which consists of a number of different switches organized to redirect data packets to a final destination. As shown in FIG. 1, the switching fabric may be viewed as a number of "subnets" 100 connected by routers 102. Each of the subnets 100 services a number of end nodes 104, and has multiple switches that provide data communications between nodes in the subnet, and with at least one router 102 connected to outside nodes via one or more other subnets. While at a rudimentary level an InfiniBand® fabric does not necessarily require any switches or routers, the arrangement shown in FIG. 1 may be considered a useful example of an InfiniBand® fabric.

Within each subnet, there is control of the components of that subnet through use of at least one "subnet manager." Subnet managers are hardware or software entities that configure, monitor or control other entities connected to the subnet fabric, or somehow provide a service to the fabric. Within each subnet is at least one subnet manager associated with one of the nodes of the subnet. The subnet manager may reside at any of the nodes of the subnet, including the switches and routers. There may be more than one subnet manager, in which case established rules cause arbitration between the subnet managers to assign the status of master to one of the subnet managers, while the others act as slaves.

Figure 2:
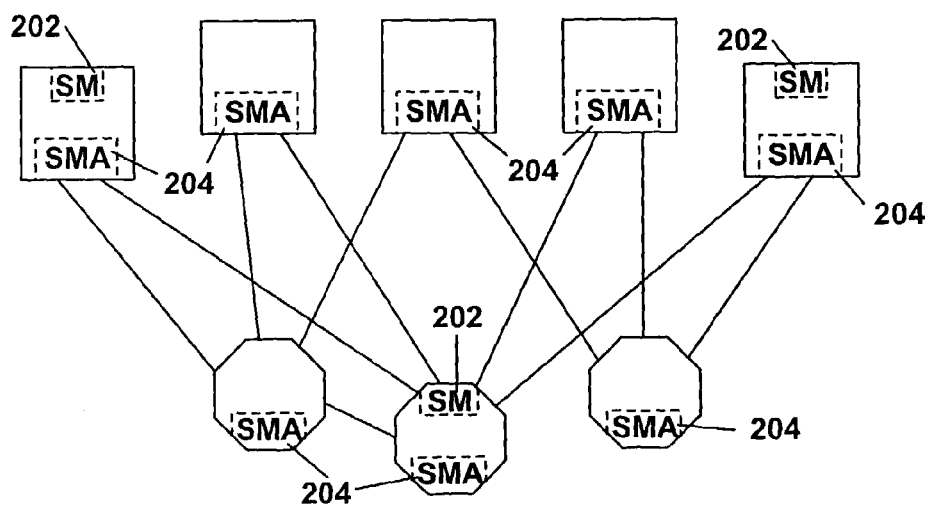
FIG. 2 is a schematic view of a subnet of a network such as that shown in FIG. 1.

Every node of a subnet must also have a "subnet management agent," which is a component associated with the node in question that enables some functions of the entity at that node to be managed by a subnet manager. In general, the subnet management agents do not implement policy, but receive, act on and respond to requests from managers. FIG. 2 shows a schematic representation of a subnet arrangement including subnet managers 202 and subnet management agents 204. As shown, each of the nodes has a subnet management agent 204, including switches 206. There are also several subnet managers 202 located at different nodes within the subnet. However, there are different ways in which a subnet manager or a subnet management agent may be implemented at each of the nodes. The manner in which such implementations are made can affect system performance in a number of ways.

Many conventional computer systems are not simply unitary processing systems in which a single processor and memory functions in isolation. More complex systems are becoming commonplace, those systems having a number of components, all of which must interact smoothly. Some newer systems provide an extra layer of control through the use of a "service processor," which coordinates the components of the system. The service processor is a standalone computing resource within the host computer that communicates with all of the components of the host computer. Using a service bus, which is separate from the system memory bus, and is often a serial bus, the service processor controls, configures and manages the different components of the host computer, and resolves any conflicts that arise.

Figure 3:
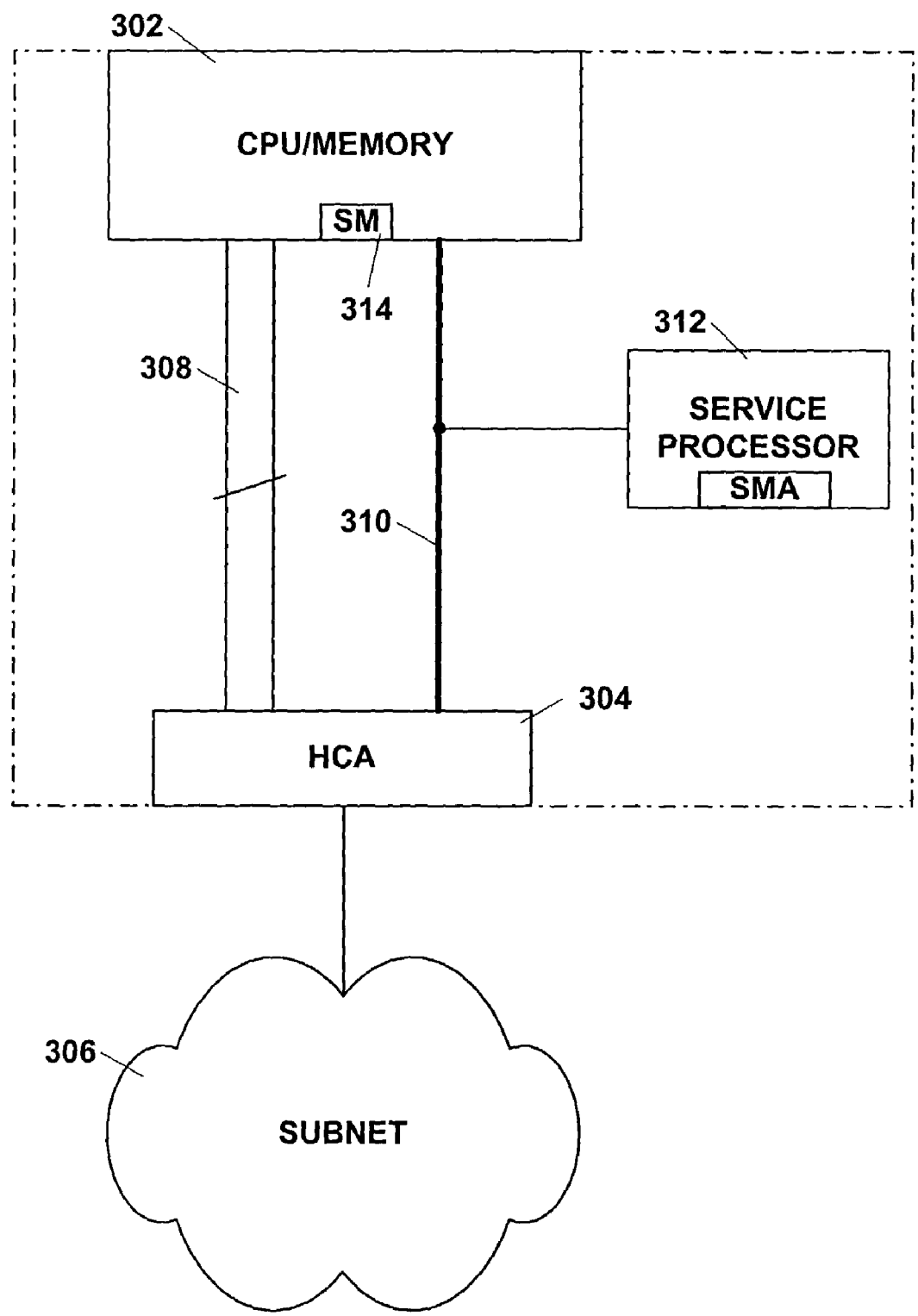
FIG. 3 is a schematic view of a first computer configuration for use in packet switched I/O communication.

Shown schematically in FIG. 3 is a system that has a main processing core 302, including at least one CPU and memory. The system 302 is connected to a packet switched subnet 306 via a host channel adapter 304. As shown, the processing core 302 is linked to the host channel adapter 304 by virtue of both being connected to a memory bus 308 and to a "service bus" 310. In this embodiment, the memory bus 308 is shown as being a parallel bus, while the service bus 310 is a serial bus, although other types of bus structures might be used as well. Also connected to the service bus 310 is a service processor 312, which functions as a standalone supervisory computer for the system.

In FIG. 3, host 302 is shown as including a subnet manager 314 although, as described above, one or more managers may instead, or additionally, be located elsewhere in the subnet. In this embodiment, however, the subnet management agent for this node is run by the service processor. The service processor 312 also performs all of the supervisory functions of a conventional service processor but, by locating the subnet management agent at the service processor, rather than at the host processor, a number of advantages are gained. For example, there is enhanced security with regard to the overall system, since only the service processor, and not the host computer, need be trusted to properly process management requests. There is also better availability, since a crash of the host computer's operating system will not disrupt operation of the subnet management agent. There is no need to transition control of the hardware between an agent running as part of the host computer's boot firmware and one running as part of the host operating system. And, there is only the need for one version of the agent software to run on the service processor, rather than one version within the boot firmware and a different one within the host operating system.

The connections between the supervisor, and the hosts and host channel adapter are via the service bus, which is a serial data path via which the service processor sends instructions to each of the hosts and host channel adapters of the system (although only one host processor and one host channel adapter are shown in FIG. 3, the system may accommodate more). The management data packets of a packet-switched I/O system, such as InfiniBand®, can be distinguished from the standard data packets by the content of their header. When a management data packet is detected at one of the host channel adapters, it is routed to the service processor 312 for handling. At that point, it is not clear whether the data packet is intended for the subnet manager or a subnet management agent. However, the service processor 312, acting as the subnet management agent, evaluates the data of the packet. If it is intended for the subnet management agent, the service processor 312 processes it accordingly. If the data indicates that the packet is intended for the subnet manager 314, the service processor forwards the packet to the host computer 302 (assuming there is a local subnet manager, as shown in FIG. 3). Alternatively, the incoming management packets could be first examined by the subnet manager at the host processor 302. However, this would create a dependency on the host processor for subnet management agent activities, and would thus limit the security, availability and cost benefits discussed above.

Figure 4:
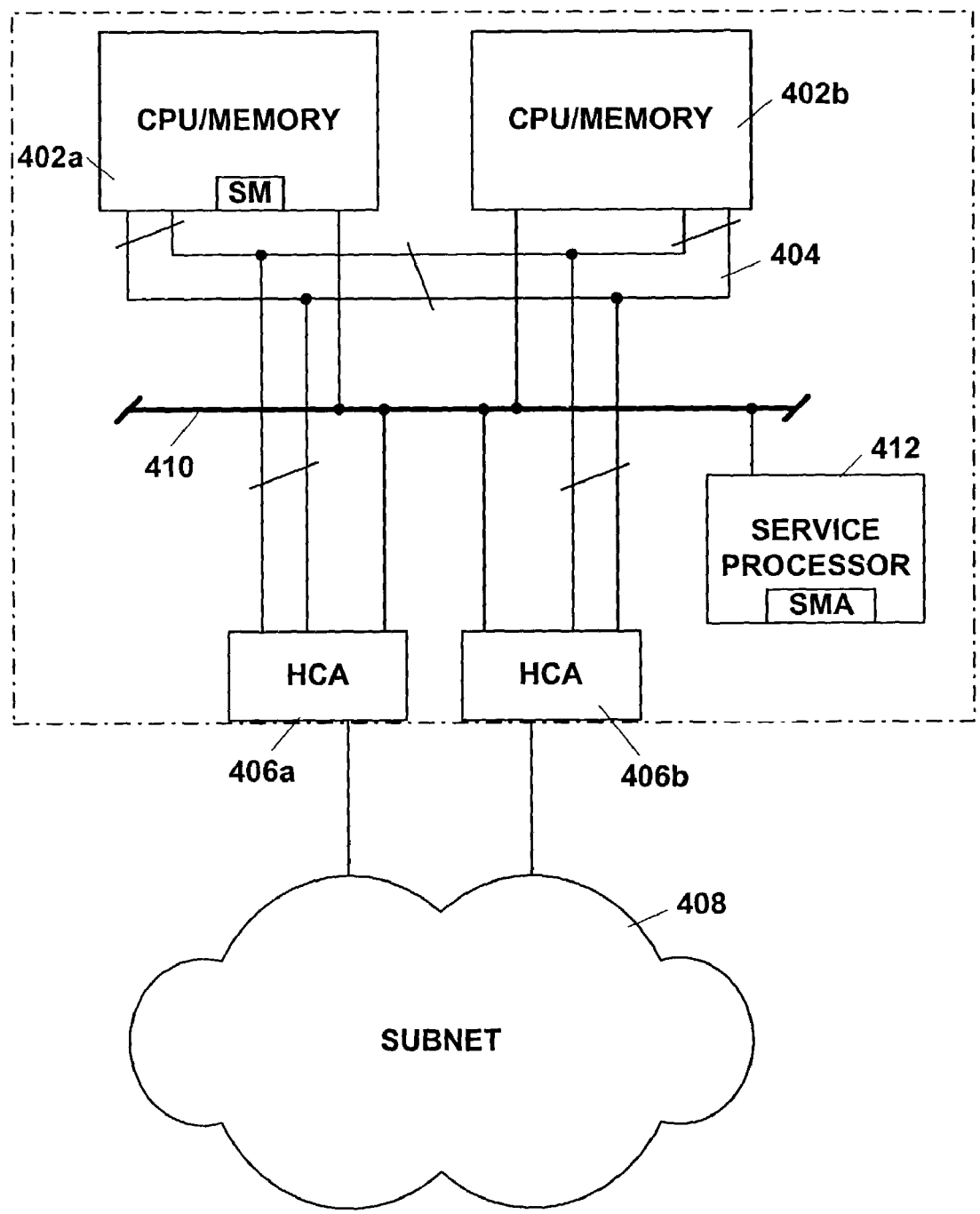
FIG. 4 is a schematic view of a second computer configuration for use in packet switched I/O communication in which multiple host channel adapters are used.

Shown in FIG. 4 is a node having two separate host processing cores 402a, 402b each having at least one CPU and local memory, and both being connected to a memory bus 404. These processors may both be used by a single operating system running on the host computer, the resources being applied as appropriate. Also shown in the figure are two host channel adapters 406a, 406b that provide communication with the subnet 408. Neither of the host channel adapters 406a, 406b is associated with a particular one of the processing cores 402a, 402b, but are both available as resources to the system as a whole. Both of the host channel adapters 406a, 406b are connected to the memory bus, allowing for large-scale data transfers. The host channel adapters are also connected to service bus 410, as are the main processing cores 402a, 402b. Thus, the service bus 410 provides a serial communication path between components of the system. Also connected to the service bus 410 is service processor 412, which preferably performs all of the service processor tasks known in the prior art. In addition to conventional service processor tasks, in the embodiment of FIG. 4, the service processor runs the subnet management agent. In the embodiment shown, a subnet manager is located at the processing core 402a, although those skilled in the art will recognize that alternate, or additional, subnet managers could be located elsewhere in the subnet.

Figure 5:
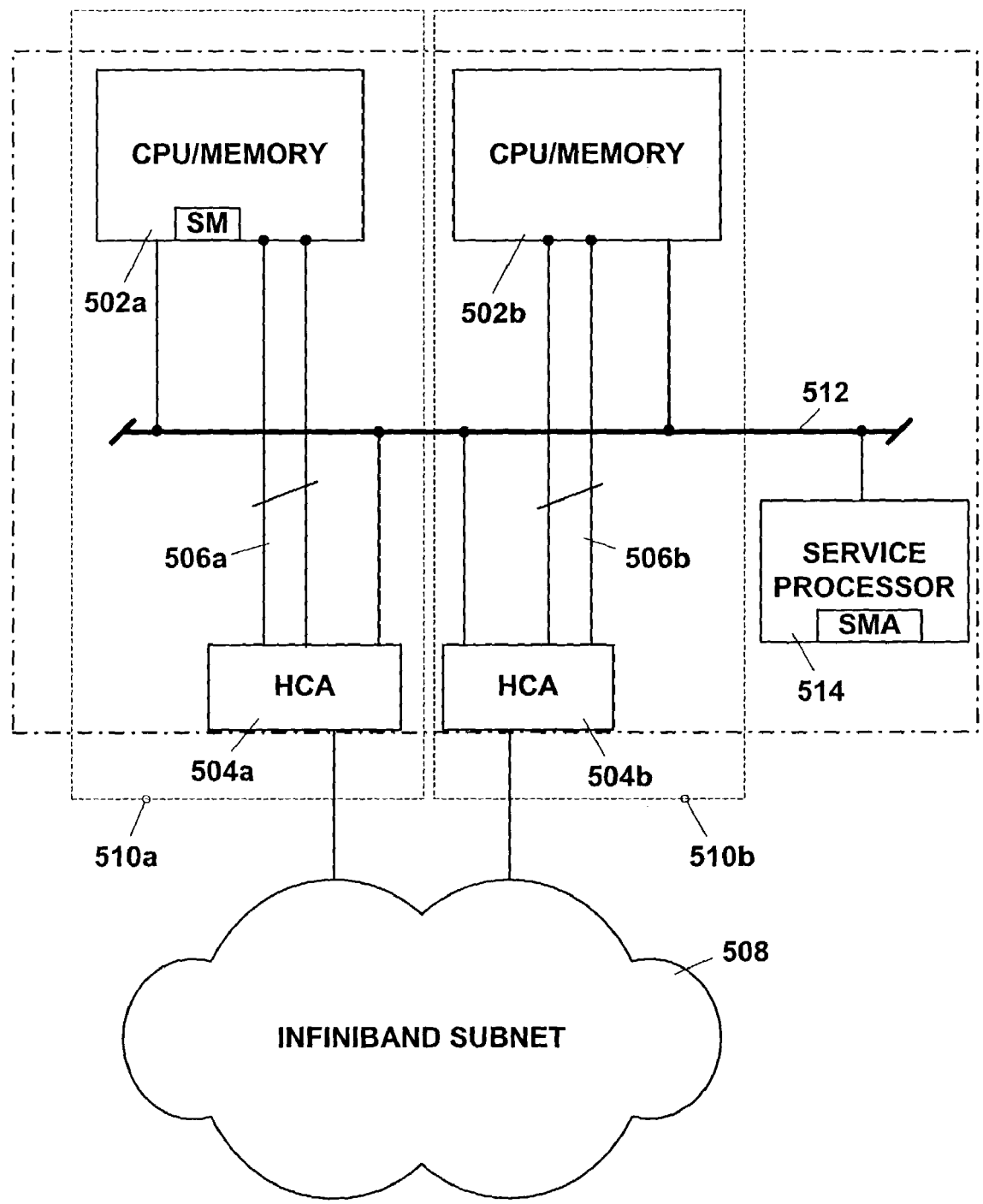
FIG. 5 is a schematic view of a third computer configuration for use in packet switched I/O communication in which multiple host channel adapters and multiple host processors are used.

The embodiment of FIG. 5 is similar to that of FIG. 4 in that it shows a system having multiple host processing cores 502a and 502b. However, in this embodiment, the two processing cores have separate memory busses 506a, 506b, although these busses are not necessarily physically or permanently separate. Rather, the busses are configured to be separate by the service processor. A different host channel adapter 504a, 504b is connected to each of the memory busses 506a, 506b, providing a dedicated connection to the subnet for only its respective processing core 502a, 502b. In this configuration, the system may be viewed as two separate "domains" 510a, 510b, each of which functions independently of the other. However despite their relative independence, each of the processing cores 502a, 502b and host channel adapters 504a, 504b is connected to a service bus 512. Via the service bus, the components of both domains 510a, 510b are supervised by service processor 514, which performs all the conventional tasks of a service processor. The service processor also runs the subnet management agent for both domains. As in other embodiments, the subnet manager is shown being run by one of the processing cores 502a, although it may also be run elsewhere in the subnet.

Figure 6:
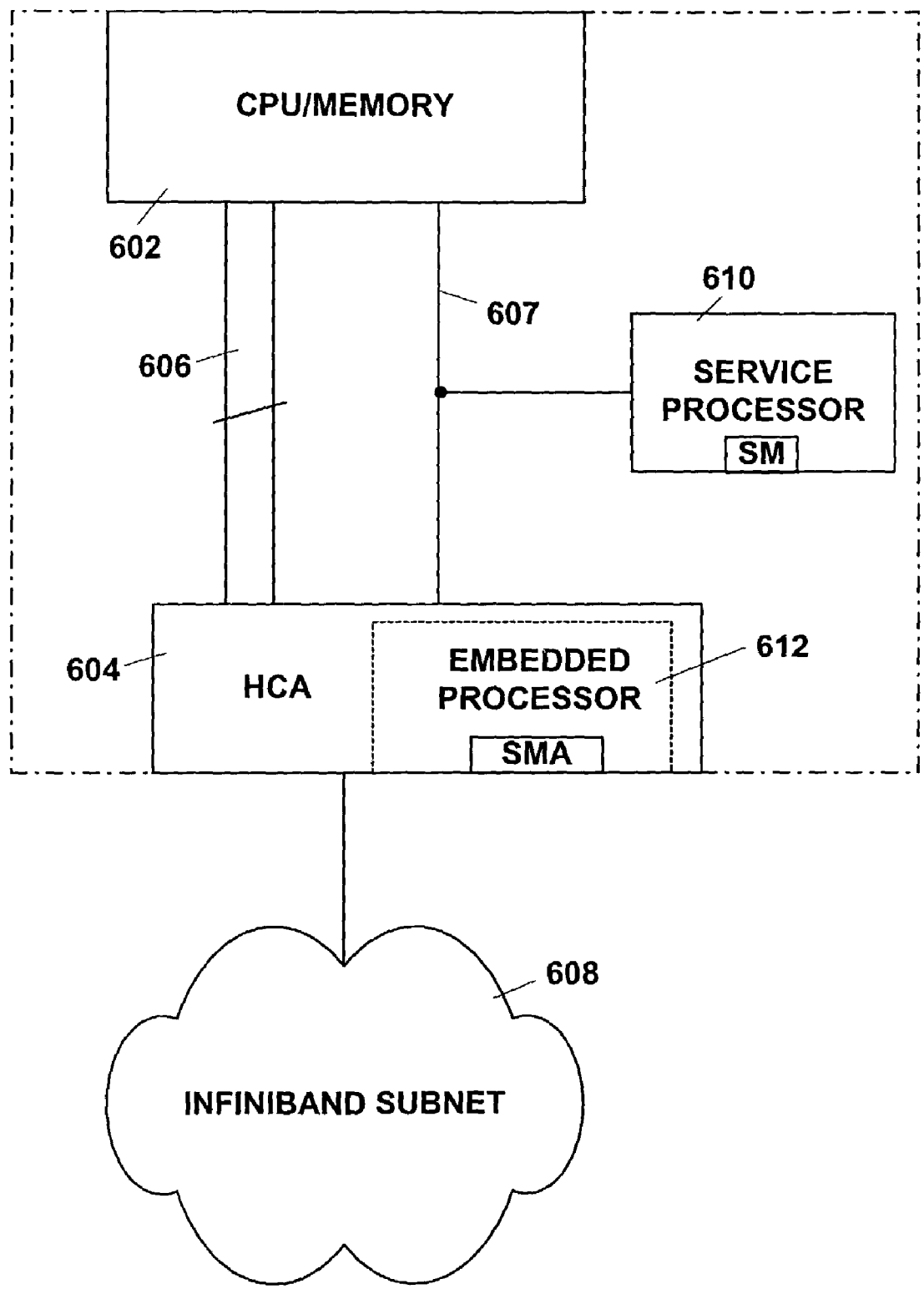
FIG. 6 is a schematic view of a fourth computer configuration for use in packet switched I/O communication in which an embedded processor is located in a host channel adapter.

Shown in FIG. 6 is an alternative embodiment of the present invention in which a processing core 602 is connected to a host channel adapter 604 by memory bus 606. The host channel adapter 604 provides communication between the processing core and the subnet 608. Both the processing core 602 and the host channel adapter 604 are also connected to a service bus 607, along which instructions from service processor 610 are transmitted. However, in this embodiment, the subnet management agent is not run by the service processor. Rather, the host channel adapter 604 includes a separate embedded processor 612 that is used to run the subnet management agent. In the embodiment shown in FIG. 6, a subnet manager is run by the service processor.

Running the subnet management agent in the embedded processor rather than in the host processor has many of the advantages noted above in describing the running of the subnet management agent in the service processor. These include enhanced security, better availability, no need to transition between control by a subnet management agent running as part of the boot firmware and one running as part of the operating system, and no need for multiple versions of the subnet management agent running as part of the boot firmware and the operating system. Similar advantages are provided with regard to the subnet manager by running it in the service processor rather than the host processor. Running the subnet management agent in an embedded processor rather than in the service processor also gives the advantage of greatly reducing the bandwidth requirements on the service bus, since the management packets do not need to flow between the service processor and the host channel adapter.

Figure 7:
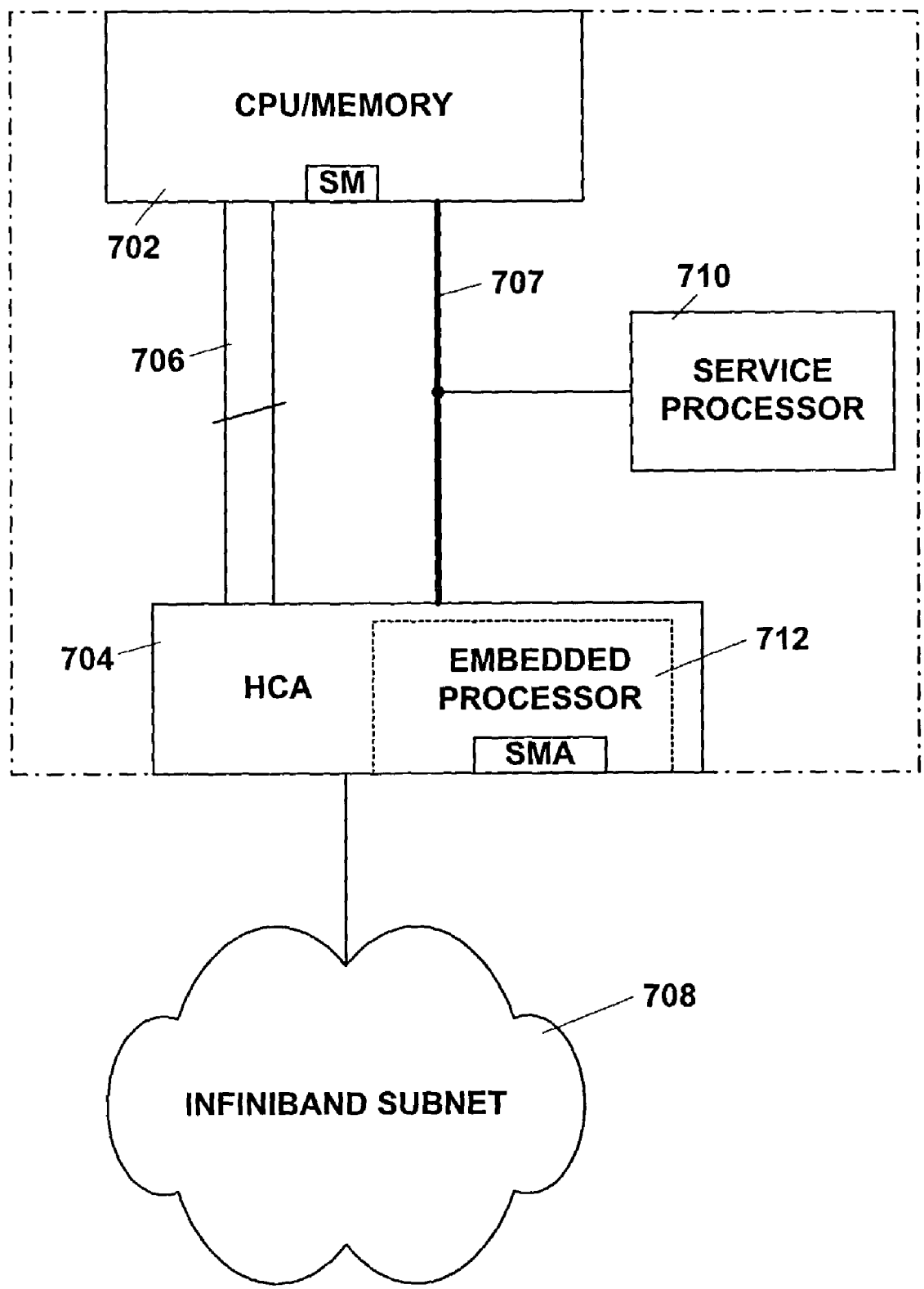
FIG. 7 is a schematic view of a fifth computer configuration for use in packet switched I/O communication that is similar to that of FIG. 6, but with an alternate assignment of subnet messaging control elements.

An arrangement similar to that of FIG. 6 is shown in FIG. 7, in which a processing core 702 is connected to host channel adapter 704 via a memory bus 706. The host channel adapter 704 provides communications with the subnet 708, and also contains an embedded processor 712 that is used to run the subnet management agent. The processing core 702 and host channel adapter 704 are also connected to a service bus 707, via which instructions are provided by the service processor 710. However, in this embodiment, rather than running the subnet manager with the service processor, it is run by the main processing core 702. Running the subnet manager in the host versus running it in the service processor has the advantage of greatly reducing the bandwidth requirements in the service bus. Also, the greater processing power of the host may allow implementation of a more functional subnet manager, for example, one having more features or better performance.

Those skilled in the art will recognize, of course, that certain software configurations may work better with particular hardware arrangements. Nevertheless, in the illustrative embodiment, for a given hardware arrangement, the system may dynamically change between different configurations, such as those described above. For example, a system might be initially configured as in FIG. 6, with the subnet manager in the service processor. At a later time, one might wish to reconfigure the software to be as shown in FIG. 7, with the subnet manager in the host processor. Such a change might be made, for example, in order to run a more capable or feature-filled subnet manager, or to reduce the bandwidth requirements on the service bus after more nodes to be managed are added to the InfiniBand® subnet. Such a reconfiguration would be accomplished without interrupting system activity by dynamically activating and deactivating the appropriate software components (in this case, the subnet manager) in the various processing complexes, and by modifying the control hierarchy which determines the routing of management packets within the system. A more specific example of how to perform a reconfiguration such as this is described hereinafter.

Figure 8:
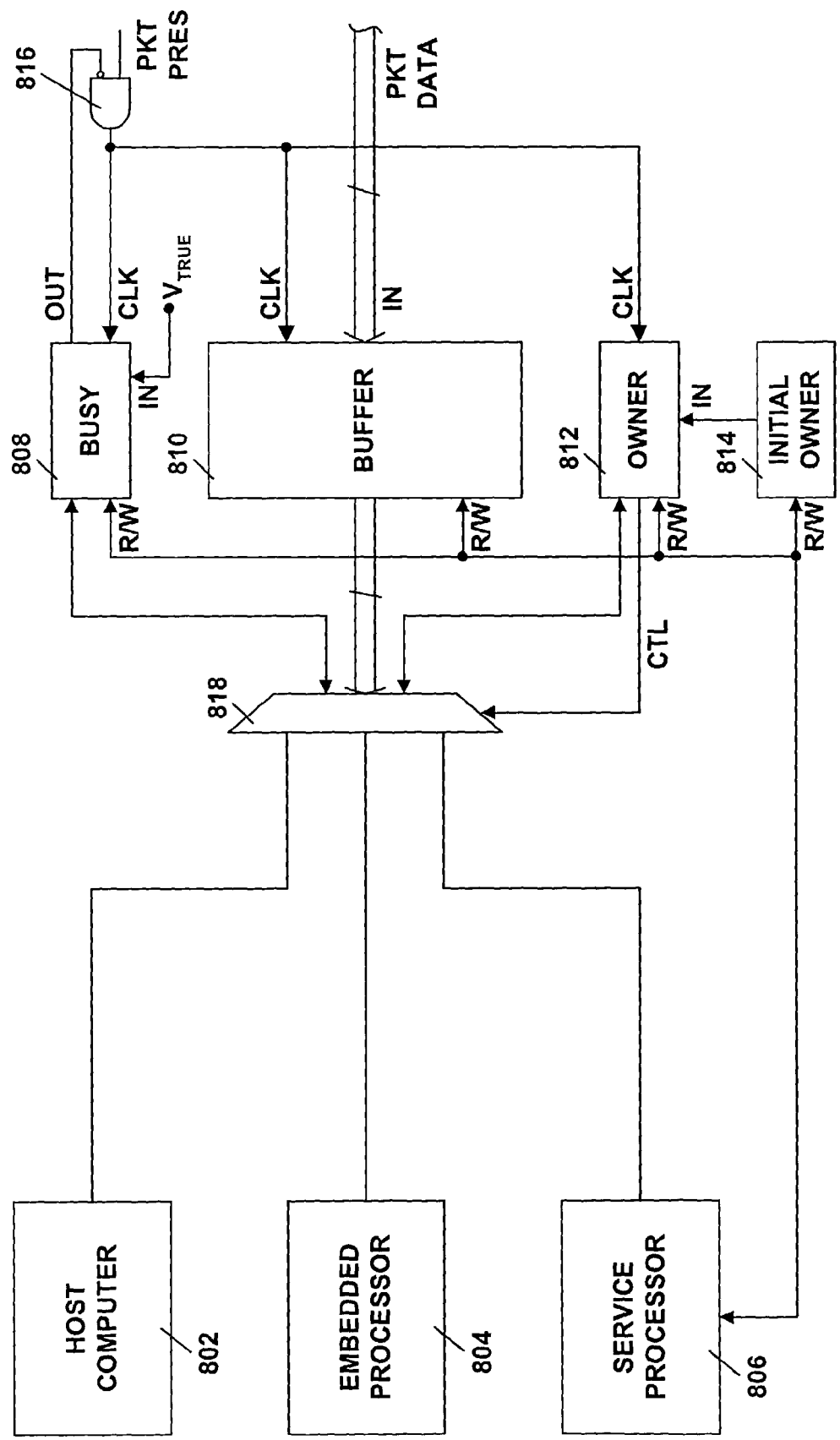
FIG. 8 is a schematic view of a logical environment of computer system according to the present invention for handling incoming subnet packet data.

An example of a control hierarchy according to the present invention is depicted in FIG. 8. This figure shows the interaction between the potential owners in a system having a host computer 802, an embedded processor 804 and a service processor 806. In FIG. 8, each of these components is represented graphically by a single labeled box. The figure also shows a set of registers that may be used to control the flow of packet data. Those skilled in the art will recognize that these registers may be implemented in hardware or software, or some combination of the two, and that it is the functionality that they depict that is most important. The registers depicted include the busy register 808, the packet data buffer 810, the owner register 812 and the initial owner register 814.

As shown, at least two signals may enter the node from the subnet, the packet data itself and a signal indicative of the presence of a new packet. The "PKT PRES" signal is used to trigger a new clock cycle in the registers, and initiate the copying of the packet data to the packet buffer. The triggering of the clock cycle is also controlled by the contents of the BUSY register 808, which indicates whether a valid packet is present in the buffer 810. The register may have only a single bit which, when asserted, indicates that a new packet is available in the buffer, and awaiting removal by the current packet owner. For this reason, when the BUSY bit is high, the ability of the packet present signal to initiate the loading is inhibited. This is indicated in the figure by AND gate 816, which has as its two inputs the PKT PRES signal and the BUSY bit itself. The BUSY bit is input via an inverter, so that when it is high, the output of the AND gate 816 is held low. However, when the BUSY bit is reset to a low state, and a packet present signal (asserted high) is at the other gate input, a clock cycle is initiated in the form of signal CLK.

The initiation of the CLK signal has an effect on each of several of the registers. It causes loading of the new packet data into the packet buffer 810. It also sets the BUSY bit (by clocking in the "logic 1" value indicated in the figure as "$V_{TRUE}$"), thereby preventing subsequent packet present signals from causing the packet data in the buffer from being overwritten before it is read out. In addition, the CLK signal is input to OWNER register 812 so as to copy the contents of the INITIAL OWNER register to the OWNER register.

Of the three controllers, only one can be the current "owner" of the incoming packet data. As discussed above, the owner receives the packet data from the subnet, acting upon it or forwarding it to the appropriate destination. An indication of the current owner (such as a two-bit code) is maintained by the OWNER register so that any necessary action regarding the incoming packet data will be taken by the correct one of the host computer, the embedded processor or the service processor. Upon the receipt of a CLK signal, the OWNER register ensures that the data will flow to the correct processing center. This control is represented in FIG. 8 by multiplexer 818, the switching of which is controlled by the OWNER register 812. Thus, the packet data is switched to the proper one of host computer 802, embedded processor 804 or service processor 806 according to the CTL signal output by the OWNER register. Those skilled in the art will recognize that the "multiplexing" function may be embodied in software or different hardware logic, and that an actual multiplexer is not necessary.

Also shown in FIG. 8 is INITIAL OWNER register 814. One of the processing centers, in this case service processor 806, is charged with loading the value of an initial owner into register 814. Like the contents of the OWNER register 812, this value may be represented, for example, by a two-bit code. Upon reception of a new packet, this value will be loaded into the OWNER register 812, and will designate which of the processing centers is the owner for the purpose of performing initial processing on each data packet. Thereafter, the value in the OWNER register may be changed dynamically by the current owner if processing by a different processing center is desired. Only the service processor, however, is able to directly read or to change the contents of the INITIAL OWNER register 814.

Figure 8A:
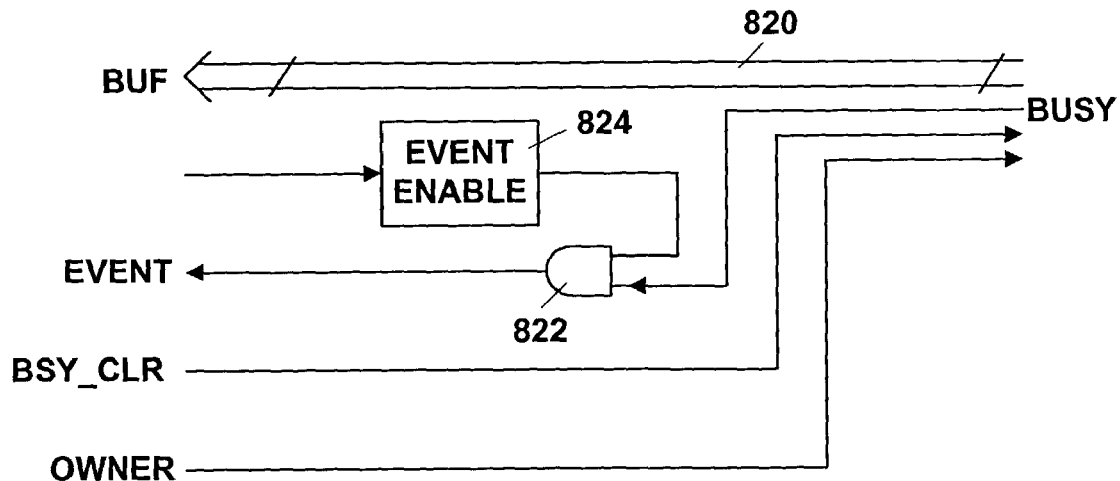
FIG. 8A is a schematic view of a logical environment of a processing center of the computer system of FIG. 8.

The actions taken by the current owner are described in conjunction with FIG. 8A, which is a schematic depiction of the necessary components and signal paths for control of the incoming packet data. This figure is a representation of how any one of the processing centers that is designated as owner could handle the control of incoming subnet packet data. The parallel packet data path 820 is shown as incoming, and is labeled "BUF." Another signal that is received by the processor is the content of the BUSY register. This BUSY signal is input to AND gate along with the content of EVENT ENABLE register 824. Again, those skilled in the art will recognize that the manner of depicting this logical process is illustrative only, and that the steps undertaken could be implemented in a number of different ways. The controller sets the content of the event enable register (which may be a single bit) to a high assertion level when it is prepared to monitor the incoming packet data activity. Therefore, when the output of register 824 is high, and the BUSY bit is set high, an output from AND gate 822 is asserted high, indicating that a new packet event has occurred (i.e., a new packet has been received). The controller will then read the packet data off the buffer lines 820.

Once the packet data is received, an output BSY_CLR may be sent to the BUSY register that sets the BUSY bit back to a low state, until it is once again set high when a new data packet is received. The controller also has access to the OWNER register field, and can change the current owner. Thus, if a packet is received that is intended for another processing center within the system, the OWNER field may be changed without the BUSY bit being cleared. This would result in a new owner proceeding through the steps necessary to process the data packet.

Figure 9B:
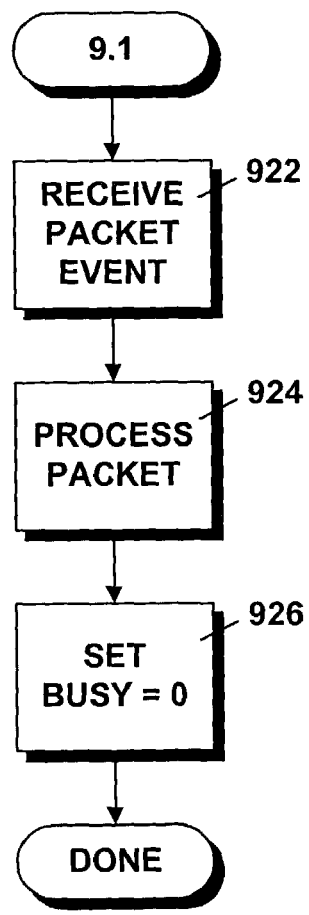
FIGS. 9A and 9B are a flowchart showing a logical routine of a system such as that of FIGS. 8 and 8A for handling control of incoming packet data.
Figure 9A:
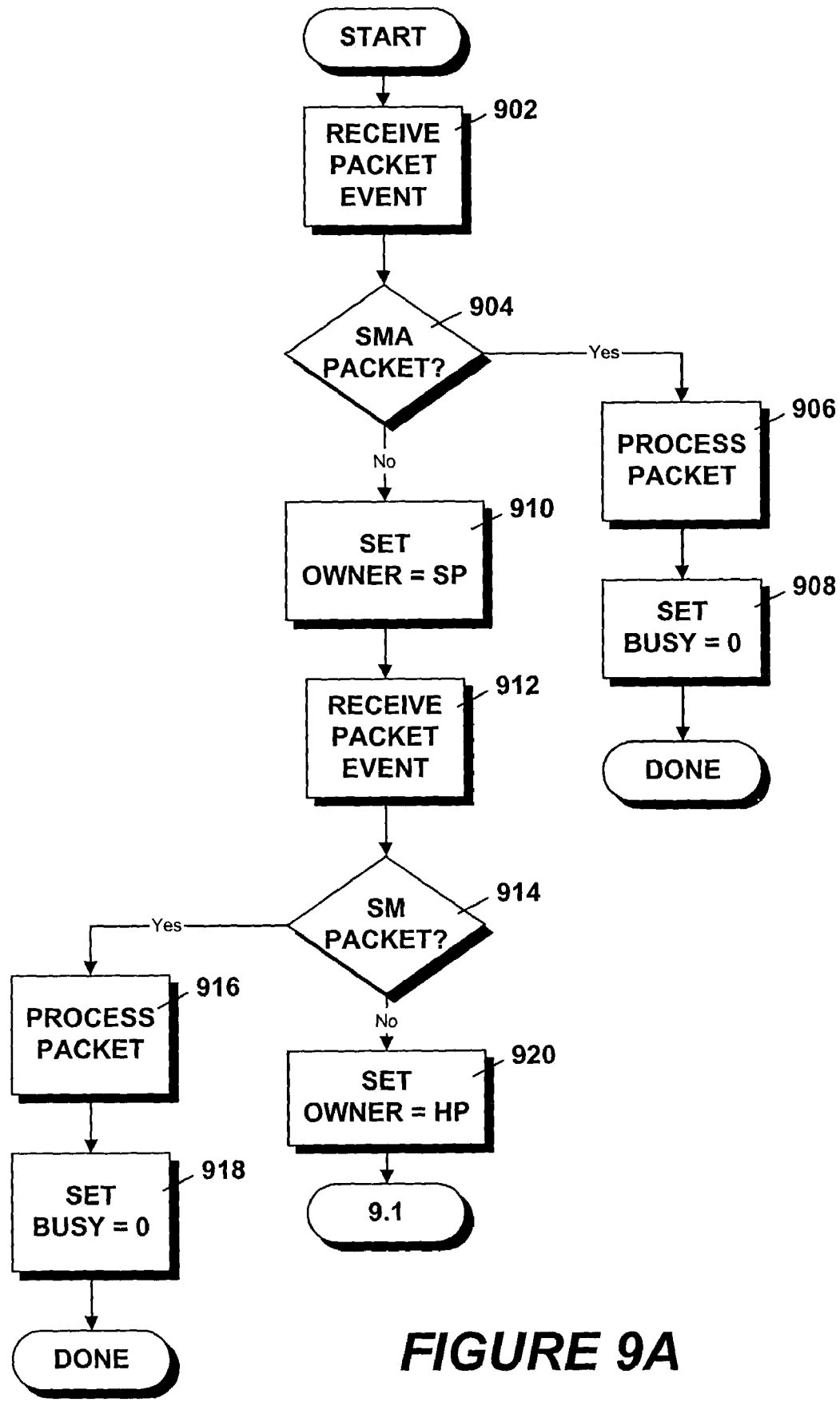

FIGS. 9A and 9B show an example set of steps for handling a packet in a system having a logic configuration such as that shown in FIGS. 8 and 8A. In this particular example, an embedded processor runs the subnet management agent, while the service processor runs the subnet manager. Such a configuration is shown in FIG. 6. The initial owner for this configuration is the embedded processor, so that following step 902 shown in FIG. 9A, in which the packet event is received by the embedded processor, it analyzes the packet to determine whether it is a subnet management agent packet. If so, it processes the packet (step 906) and clears the BUSY bit (step 908), after which the procedure is suspended pending the arrival of the next packet.

If, in step 904, it is determined that the packet is not a subnet management agent packet, the embedded processor changes the OWNER field to the code representing the service processor (step 910). The service processor then identifies the packet event and receives the packet (step 912). It determines whether the packet is a subnet management packet (step 914) and, if so, processes the packet (step 916). The service processor then clears the BUSY bit (step 918) and the procedure is suspended pending the arrival of the next packet.

If the service processor in step 914 determines that the packet is not a subnet management packet, it changes the OWNER field to the host processor (step 920). The process is then continued by the host processor as shown in FIG. 9B. As shown, the host processor identifies the packet event and receives the incoming packet data (step 922). It processes the packet (step 924) and clears the BUSY bit (step 926), after which the procedure is suspended until the receipt of the next packet event.

Although the foregoing example is directed to the configuration of FIG. 6, and assumes a certain default ownership, as well as a certain order in which the ownership is changed, those skilled in the art will easily reproduce similar routines for other configurations, and such routines are considered to be well within the scope of the invention.

As mentioned above, the present invention allows a system to be reconfigured without interrupting system operation. For example, it may be desirable to reconfigure from a system arrangement as shown in FIG. 6, with the subnet manager in the service processor, to one as shown in FIG. 7, in which the subnet manager is in the host processor. In such a case, the following steps may be followed.

First, while the original subnet manager software is still running on the service processor, a new instance of the subnet manager software is executed on the host processor. The particular details of executing this software depend on the operating system software being used, but are well within the ability of those skilled in the art. For example, if the operating system is a Unix® system, a "rexecd" or "rsh" command might be used (Unix® is a registered trademark of The Open Group).

It may be desirable to convey current status or policy data from the currently-executing subnet manager on the service processor to the new instance of the subnet manager. This could be done in a number of ways. For example, the two managers could communicate the data using a standard network communication protocol. Alternatively, the entity directing the reconfiguration could extract relevant data from the subnet manager running on the service processor and then inject that data into the new subnet manager, using whatever management interfaces are being supported.

After the new instance of the subnet manager is executed, the control hierarchy that determines the routing of management packets within the system is altered. The alteration should reroute the subnet management packets to the host processor, rather than the service processor. Depending on the configuration existing before the change, this rerouting could be accomplished in one of two different ways. If the service processor was the entity that first examines the incoming management packets, then this responsibility must be moved to the host processor. Using a control mechanism such as that described above in conjunction with FIGS. 8-9B, the INITIAL OWNER register would be set to a value that identifies the host processor as the "initial owner" of the management packets.

If the embedded processor was the entity set for first examining incoming management packets then, to change the routing, that processor is instructed to route packets intended for the subnet manager to the host processor, rather than the service processor. The particular method for doing this depends on the particular hardware implementation of the system, but is well within the ability of one skilled in the art. For example, if the service processor has access to some of the memory of the embedded processor via the service bus, then it could change a state variable in that shared memory. Using a control mechanism such as that described above in conjunction with FIGS. 8-9B, once the embedded processor receives the rerouting instruction, it will change its behavior such that, upon receiving a management packet intended for the subnet manager, it changes the OWNER register to a value that identifies the host processor.

Once the foregoing steps are implemented, the instance of the subnet manager that was running on the service processor is deactivated. Again, the specific method of doing this depends on the particular system configuration, but is well within the ability of one skilled in the art using well-known mechanisms.

The present invention provides a system that is highly flexible in allowing different processing centers of the system to function in the different capacities of subnet manager and subnet management agent as is appropriate for a situation at hand. This flexibility allows for dynamic configuring of the system so as to maximize the efficiency or security of the packet switched I/O operations. Thus, while the invention has been shown and described with reference to certain embodiments thereof, it will be recognized by those skilled in the art that various changes in form and detail may be made herein without departing from the spirit and scope of the invention as defined by the appended claims.

What is claimed is:

1. A communication node connected to a packet-switched data input/output network, the node comprising:
    a host channel adapter that provides a communication interface between the network and the node;
    a host computer that runs a host operating system and includes a host processor;
    a service processor that performs supervisory operations including the configuration and management of components of the host computer, wherein one of the host processor and the service processor runs a subnet management agent software routine that configures components of the node in response to predetermined network management instructions; and
    a hierarchical control system that, when implemented, moves the subnet management agent from one to the other of the host processor and the service processor, the control system comprising:
        a packet data buffer configured to receive packet data from the network, the packet data comprising at least the management instructions;
        a first register that maintains a representation indicative of the component currently charged with the processing of the management instructions and is written to by one of the host processor and the service processor to dynamically change the component currently charged with the processing of the management instructions;
        a second register operatively connected to the first register that maintains a representation indicative of the default component charged with initial receipt of the management instructions;
        a third register configured to receive an enable signal from the network wherein the enable signal triggers a clock cycle in the first register, the second register and the packet data buffer; and
        a multiplexer operatively connected to the first register and the packet data buffer;
        wherein, upon receipt of the enable signal, the packet data and the representation maintained in the first register are loaded into the multiplexer such that the multiplexer controls the flow of the packet data to the component currently charged with the processing of the management instructions.

2. A communication node according to claim 1 wherein the subnet management agent runs on the service processor.

3. A communication node according to claim 1 wherein the subnet management agent runs on the host processor.

4. A communication node according to claim 1 wherein the network follows an InfiniBand® protocol.

5. A communication node according to claim 1 wherein the node further comprises a memory bus, by which data is transmitted between components of the node, and a service bus, by which the management instructions are transmitted between components of the node.

6. A communication node according to claim 5 wherein the service bus is a serial bus.

7. A communication node according to claim 1 wherein the host channel adapter is one of a plurality of host channel adapters in the node.

8. A communication node according to claim 1 wherein the host computer is one of a plurality of host computers in the node.

9. A communication node according to claim 1 wherein the host channel adapter comprises an embedded processor having a processing core independent from that of the service processor and that of the host processor and wherein the subnet management agent can be moved to the embedded processor.

10. A communications node according to claim 1 further comprising a data buffer in which data received over the network by the node is stored, wherein a component identified by the representation in the first register retrieves data from the buffer when the data comprises the management instructions.

11. A communication node connected to a packet-switched data input/output network that follows an InfiniBand® protocol, the node comprising:
    a host channel adapter that provides a communication interface between the network and the node;

a host computer that runs a host operating system and includes a host processor;

a service processor that performs supervisory operations including the configuration and management of components of the host computer;

an embedded processor dedicated to the host channel adapter and having a processing core independent from those of the service processor and the host processor, wherein one of the host processor, the service processor and the embedded processor runs a subnet management agent software routine that configures components of the node in response to predetermined network management instructions;

a memory bus by which data is transmitted between components of the node;

a service bus by which management instructions are transmitted between components of the node; and a hierarchical control system that, when implemented, moves the subnet management agent from one to another of the host processor, the service processor and the embedded processor, the control system comprising;

a packet data buffer configured to receive packet data from the network, the packet data comprising at least the management instructions;

a first register that maintains a representation indicative of the component currently charged with the processing of the management instructions and is written to by one of the host processor and the service processor to dynamically change the component currently charged with the processing of the management instructions; and a second register operatively connected to the first register that maintains a representation indicative of the default component charged with initial receipt of the management instructions;

a third register configured to receive an enable signal from the network wherein the enable signal triggers a clock cycle in the first register, the second register and the packet data buffer; and a multiplexer operatively connected to the first register and the packet data buffer;

wherein, upon receipt of the enable signal, the data packet and the representation maintained in the first register are loaded into the multiplexer such that the multiplexer controls the flow of the packet data to the component currently charged with the processing of the management instructions.

12. A communication node connected to a packet-switched data input/output network, the node comprising:

a host channel adapter that provides a communication interface between the network and the node;

a host computer that runs a host operating system and includes a host processor;

an embedded processor dedicated to the host channel adapter that has a processing core independent from the host processor, wherein one of the host processor and the embedded processor runs a subnet management agent software routine that configures components of the node in response to predetermined network management instructions; and a hierarchical control system that, when implemented, moves the subnet management agent from one to another of the host processor, the service processor and the embedded processor, the control system comprising;

a packet data buffer configured to receive packet data from the network, the packet data comprising at least the management instructions;

a first register that maintains a representation indicative of the component currently charged with the processing of the management instructions and is written to by one of the host processor and the service processor to dynamically change the component currently charged with the processing of the management instructions; and a second register operatively connected to the first register that maintains a representation indicative of the default component charged with initial receipt of the management instructions;

a third register configured to receive an enable signal from the network wherein the enable signal triggers a clock cycle in the first register, the second register and the packet data buffer; and a multiplexer operatively connected to the first register and the packet data buffer;

wherein, upon receipt of the enable signal, the packet data and the representation maintained in the first register are loaded into the multiplexer such that the multiplexer controls the flow of the packet data to the component currently charged with the processing of the management instructions.

13. A communication node according to claim 12 wherein the subnet management agent runs on the embedded processor.

14. A communication node according to claim 12 wherein the subnet management agent runs on the host processor.

15. A communication node according to claim 12 wherein the network follows an InfiniBand® protocol.

16. A communication node according to claim 12 wherein the host channel adapter is one of a plurality of host channel adapters in the node.

17. A communication node according to claim 12 wherein the host computer is one of a plurality of host computers in the node.

18. A communications node according to claim 12 further comprising a data buffer in which data received over the network by the node is stored, wherein a component identified by the representation in the first register retrieves data from the buffer when the data comprises the management instructions.

19. A method of controlling a communication node connected to a packet-switched data input/output network, the node including a host channel adapter that provides a communication interface between the network and the node, a host computer that runs a host operating system and includes a host processor, and a service processor that performs supervisory operations including the configuration and management of components of the host computer, the method comprising:

running a subnet management agent software routine with one of the host processor and the service processor, wherein the subnet management agent configures components of the node in response to predetermined network management instructions;

dynamically controlling the operation of the subnet management agent with a hierarchical control system that, when implemented, moves control of the subnet management agent from one to the other of the host processor and the service processor;

maintaining, in a first register, a representation indicative of the component currently charged with the processing of the management instructions, wherein the first register is written to by one of the host processor and the service processor to dynamically change the component currently charged with the processing of the management instructions the representation dynamically changed by one; and, in a second register, a representation indicative of the default component charged with initial receipt of the management instructions; and loading the representation maintained in the first register into a multiplexer and the representation maintained in the second register into the first register upon receipt of a new management instruction such that the multiplexer controls the flow of a packet data to the component currently charged with the processing of the management instructions.

20. A method according to claim 19 wherein the subnet management agent runs initially on the service processor.

21. A method according to claim 19 wherein the subnet management agent runs initially on the host processor.

22. A method according to claim 19 wherein the network follows an InfiniBand® protocol.

23. A method according to claim 19 wherein the node further comprising:

transmitting data between components of the node with a memory bus; and transmitting management instructions between components of the node with a service bus.

24. A method according to claim 19 wherein the host channel adapter also includes an embedded processor dedicated to the host channel adapter and having a processing core independent from that of the service processor and that of the host processor, and wherein dynamically controlling the operation of the subnet management agent includes moving control of the subnet management agent from one to another of the host processor, the service processor and the embedded processor.

25. A method according to claim 19 further comprising storing data received over the network by the node in a data buffer, wherein a component identified by the representation in the first register retrieves data from the buffer when the data comprises the management instructions.

26. A method of controlling a communication node connected to a packet-switched data input/output network, the node including a host channel adapter that provides a communication interface between the network and the node, a host computer that runs a host operating system and includes a host processor, and an embedded processor dedicated to the host channel adapter that has a processing core independent from the host processor, the method comprising:

running a subnet management agent software routine with one of the host processor and the embedded processor, wherein the subnet management agent configures components of the node in response to predetermined network management instructions;

dynamically controlling the operation of the subnet management agent with a hierarchical control system that, when implemented, moves control of the subnet management agent from one to the other of the host processor and the embedded processor;

maintaining, in a first register, a representation indicative of the component currently charged with the processing of the management instructions, wherein the first register is written to by one of the host processor and the service processor to dynamically change the component currently charged with the processing of the management instructions the representation dynamically changed by one; and, in a second register, a representation indicative of the default component charged with initial receipt of the management instructions; and loading the representation maintained in the first register into a multiplexer and the representation maintained in the second register into the first register upon receipt of a new management instruction such that the multiplexer controls the flow of a packet data to the component currently charged with the processing of the management instructions.

27. A method according to claim 26 wherein the subnet management agent runs initially on the embedded processor.

28. A method according to claim 26 wherein the subnet management agent runs initially on the host processor.

29. A method according to claim 26 wherein the network follows an InfiniBand® protocol.

30. A method according to claim 26 wherein the node further comprising:

transmitting data between components of the node with a memory bus; and transmitting management instructions between components of the node with a service bus.

31. A method according to claim 26 further comprising storing data received over the network by the node in a data buffer, wherein a component identified by the representation in the first register retrieves data from the buffer when the data comprises the management instructions.

* * * * *